(12) United States Patent
Toride et al.

(10) Patent No.: US 12,535,683 B2
(45) Date of Patent: Jan. 27, 2026

(54) ACTUATOR ALIGNED MULTICHANNEL PROJECTOR ASSEMBLY

(71) Applicant: META PLATFORMS TECHNOLOGIES, LLC, Menlo Park, CA (US)

(72) Inventors: Yuri Toride, Redmond, WA (US); Doruk Senkal, Kirkland, WA (US); Tamer Elazhary, Redmond, WA (US); Byron Taylor, Sammamish, WA (US); Yijing Fu, Bellevue, WA (US); Katherine Marie Smyth, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 954 days.

(21) Appl. No.: 17/724,128

(22) Filed: Apr. 19, 2022

(65) Prior Publication Data

US 2022/0373803 A1   Nov. 24, 2022

Related U.S. Application Data (60) Provisional application No. 63/280,398, filed on Nov. 17, 2021, provisional application No. 63/192,417, filed on May 24, 2021.

(51) Int. Cl.
 *G02B 27/01*  (2006.01)
 *G02B 7/02*  (2021.01)
(52) U.S. Cl.
 CPC ......... *G02B 27/0172* (2013.01); *G02B 7/023* (2013.01); *G02B 2027/0178* (2013.01)

(58) Field of Classification Search
 CPC ............... G02B 27/0172; G02B 7/023; G02B 2027/0178
 See application file for complete search history.

(56) References Cited

U.S. PATENT DOCUMENTS

| 9,575,221 B2 | 2/2017 | Nunnink et al. |
| 10,712,529 B2 | 7/2020 | Nunnink et al. |

(Continued)

FOREIGN PATENT DOCUMENTS

JP    2009192971 A    8/2009

OTHER PUBLICATIONS

International Search Report and Written Opinion for International Application No. PCT/US2022/029994, mailed Aug. 23, 2022, 9 pages.

(Continued)

*Primary Examiner* — Wen Huang
(74) *Attorney, Agent, or Firm* — Greenberg Traurig, LLP (57) ABSTRACT

An actuator aligned multi-channel projector assembly generates image light using a plurality of projectors. A projector includes a plurality of optical components in optical series and one or more actuators. The plurality of optical components include a light source and a plurality of optical elements. The light source generates first light. The plurality of optical elements project the first light. The first light is output from the projector and combined with a second to form an image presented via a display element of a headset to a user. The one or more actuators adjust a position of at least one optical component of the plurality of optical components relative to another optical component in order to compensate for misalignment of a portion of the image formed from the first light relative to a portion of the image formed from the second light.

19 Claims, 7 Drawing Sheets

(56) References Cited

U.S. PATENT DOCUMENTS

| | | |
|---|---|---|
| 10,937,129 B1 | 3/2021 | Fix et al. |
| 2014/0085190 A1 | 3/2014 | Erinjippurath et al. |
| 2018/0136372 A1 | 5/2018 | Patscheider et al. |
| 2019/0187482 A1 | 6/2019 | Lanman |
| 2020/0033693 A1* | 1/2020 | Lu ............... G02B 27/0093 |
| 2020/0267359 A1 | 8/2020 | Seiler et al. |
| 2020/0357952 A1 | 11/2020 | Lutgen et al. |
| 2021/0149203 A1 | 5/2021 | Chen et al. |

OTHER PUBLICATIONS

International Preliminary Report on Patentability for International Application No. PCT/US2022/029994, mailed Dec. 7, 2023, 8 pages.

* cited by examiner

ACTUATOR ALIGNED MULTICHANNEL PROJECTOR ASSEMBLY

CROSS-REFERENCE TO RELATED APPLICATIONS

This application claims the benefit of U.S. Provisional Application No. 63/192,417, filed May 24, 2021, and U.S. Provisional Application No. 63/280,398, filed Nov. 17, 2021, which are incorporated by reference in their entirety.

FIELD OF THE INVENTION

This disclosure relates generally to displays, and more specifically to actuator alignment of an actuator aligned multichannel projector assembly.

BACKGROUND

Displays are key pieces of headsets. Conventionally, optical components for displays tend to be glued into place after alignment. However, through curing of bonding adhesives, thermal effects, use (e.g., drops), or some combination thereof, the optical components may become misaligned thereby degrading performance of the display of the headset.

SUMMARY

Embodiments herein describe an actuator aligned multichannel projector assembly. The actuator aligned multichannel projector assembly may be part of a display element. One or more display elements may be integrated into a display assembly (e.g., of a headset). A multi-channel projector assembly includes a plurality of projectors that emit light. The plurality of projectors include at least one projector that emits light in a different channel than another projector of the plurality of projectors. The light from at least some of the plurality of projector assemblies is combined within the display element to form a multi-channel image that is output toward an eyebox. In some embodiments, the multi-channel projector assembly may include a projector that outputs eye tracking light in a non-visible band (e.g., near-infrared). Each of the projectors includes a plurality of optical components (e.g., light source, lenses, etc.) and a one or more actuators. A display controller dynamically controls positions of some or all of the plurality of optical components in each of the projectors via their respective one or more actuators. In this manner the display controller maintains alignment of each of the projectors and/or maintains alignment of the different projectors (e.g., to ensure a full color image is provided to the eyebox with minimal chromatic aberration).

In some embodiments, a projector is described. The projector includes a plurality of optical components that are in optical series and one or more actuators. The plurality of optical components include a light source and a at least one lens. The light source is configured to generate first light in a first color. The at least one lens is configured to project the first light. The first light is output from the projector and is combined with a second light in a different color to form an image presented via a display element of a headset to a user. The one or more actuators are configured to adjust a position of at least one optical component of the plurality of optical components relative to another optical component of the plurality of optical components in order to compensate for misalignment of a portion of the image formed from the first light relative to a portion of the image formed from the second light.

In some embodiments a method is described. A first optical component of a plurality of optical components of a projector, generates first light in a first color, and the plurality of optical components are in optical series. One or more optical components of the plurality of optical components, project the first light. The first light is output from the projector and combined with a second light in a different color to form an image presented via a display element of a headset to a user. One or more actuators adjust a position of at least one optical component, of the plurality of optical components, relative to another optical component of the plurality of optical components in order to compensate for misalignment of a portion of the image formed from the first light relative to a portion of the image formed from the second light.

In some embodiments, a non-transitory computer readable medium is described. The non-transitory computer readable medium is configured to store program code instructions, that when executed by a processor, cause a projector of the multi-channel display assembly to perform steps comprising: generating, via a first optical component of a plurality of optical components of a projector, first light in a first color, wherein the plurality of optical components are in optical series. The steps further include projecting, via one or more optical components of the plurality of optical components, the first light. The first light is output from the projector and combined with a second light in a different color to form an image presented via a display element of a headset to a user. The steps further include adjusting, via one or more actuators, a position of at least one optical component, of the plurality of optical components, relative to another optical component of the plurality of optical components in order to compensate for misalignment of a portion of the image formed from the first light relative to a portion of the image formed from the second light.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments herein describe an actuator aligned multi-channel projector assembly. The actuator aligned multi-channel projector assembly is part of a display element integrated into a display assembly. The display assembly includes one or more display elements and a display controller, and may be integrated into, e.g., a headset. For example, there may be a display element for the left eye and a separate display element for the right eye, and each display element having its own dedicated actuator aligned multi-channel projector assembly.

An actuator aligned multi-channel projector assembly projects multiple channels of light toward an eye box (e.g., region in space occupied by an eye of a user). The channels are monochromatic and may be different colors (e.g., red, green, blue, etc.), and in some embodiments may also include a non-visible band (e.g., near-infrared). The actuator aligned multi-channel projector assembly includes a plurality of projectors that each emit light (e.g., monochromic). The plurality of projectors include at least one projector that emits light in a different channel than another projector of the plurality of projectors. In some embodiments, the plurality of projectors includes projectors of different channels (e.g., a projector that emits red light, a projector that emits green light, and a projector that emits blue light), and the light from the plurality of projectors is combined to generate a full color image. In this manner, the light from at least some of the plurality of projector assemblies may be combined within the display element (e.g., within a waveguide) to form a multi-channel image that is output toward the eyebox.

A projector emits light of a single channel. In some embodiments, the projector emits monochrome light. The projector includes a plurality of optical components that are in optical series and one or more actuators. Optical series is a spatial arrangement where each of the optical components are ordered such that light from one of the optical components is sequentially acted upon in accordance with the order of the optical components. For example, if optical component 1, optical component 2, and optical component 3 are in optical series. Light from optical component 1 would be acted upon by optical component 2 and then output from the optical component 2, and the light output from the optical component 2 would be acted upon by optical component 3 and then output by the optical element 3. The plurality of optical components includes, e.g., a light source and a plurality of optical elements (e.g., lenses, gratings, apertures, etc.). In some embodiments, the optical elements may be just lenses.

The light source (e.g., two dimensional laser diode array) may be configured to generate light. The light is of a particular channel (e.g., red), and in some embodiments it may be monochrome. The plurality of lenses is configured to project the light (e.g., into a waveguide of a display element). In some embodiments, the projected light is in a visible band—such that it corresponds to a particular color channel of a multi-channel image (e.g., full color image). In these cases, the light is output from the projector and is combined with a light of different channels (e.g., blue, green, yellow, etc.) from one or more different projectors to form the multi-channel image. The light may be combined, e.g., within a waveguide of a display element, and the waveguide outcouples the multi-channel image (e.g., full color image) to the eyebox.

The one or more actuators are configured to adjust a position of at least one optical component of the plurality of optical components relative to another optical component of the plurality of optical components. The adjustment may be to, e.g., compensate for misalignment of a portion of the image formed from the light relative to a portion of the image formed from the light from one or more of the other projectors, compensate for misalignment of one or more of the plurality of optical components, or both. Misalignment may be caused by, e.g., dropping of the display assembly, thermal effects (e.g., large change in temperature), improper alignment at manufacture, some other event that causes misalignment, or some combination thereof.

A display controller dynamically may control positions of some or all of the plurality of optical components and/or other components in one or more of the actuator-aligned multi-channel projector assemblies via their respective one or more actuators. The display controller may, e.g., monitor temperatures of the projectors (and/or their optical components) using one or more temperature sensors (e.g., thermocouples). The display controller may determine (e.g., using a model, image feedback, etc.) target positions for one or more optical components based in part on the monitored temperatures. The display controller then instructs actuators to adjust positions for the one or more optical components and/or other components (e.g., lens barrel, holder, etc.) to their respective target positions.

Conventional displays typically used passive alignment techniques (e.g., lenses glued into place). In these cases, if a glued bond breaks (e.g., device is dropped) and/or there is a large temperature swing (e.g., causing a shape of a lens to change), a resulting image in a conventional display may be severely degraded. In contrast, the display assembly described herein is able to dynamically compensate for misalignment of optical elements within projectors and/or misalignment of the different projectors relative to each other (e.g., to ensure chromatic aberration in full color image is below a threshold value). For example, a temperature change causing an increase in optical power may be offset by adjusting positions (via actuators) of one or more of the optical components.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
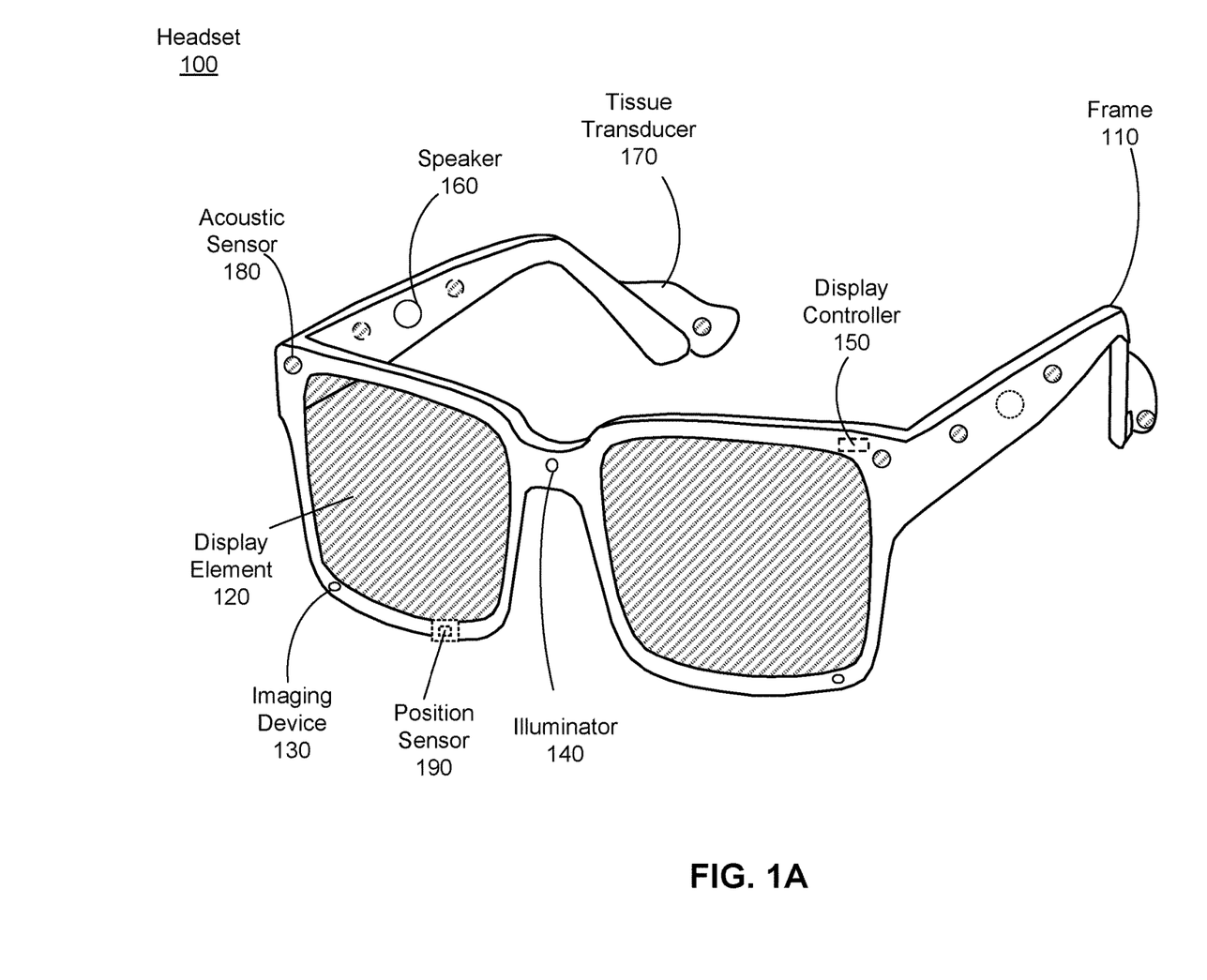
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120 and a display controller 150, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display, a reflective display, etc. The display element 120 includes an actuator aligned multi-channel projector assembly and a combination element.

The actuator aligned multi-channel projector assembly projects multiple channels of light toward an eye box. The channels may be different colors (e.g., red, green, blue, etc.), and in some embodiments may also include a non-visible band (e.g., near-infrared). In some embodiments, the channels may be monochrome. The actuator aligned multi-channel projector assembly includes a plurality of projectors that each emit light. The plurality of projectors include at least one projector that emits light in a different channel than another projector of the plurality of projectors. In some embodiments, the plurality of projectors includes projectors of different channels (e.g., a projector that emits red light, a projector that emits green light, and a projector that emits blue light). The combination element (e.g., waveguide, mirror, etc.) combines the light from the plurality of projectors to generate a full color image that is provided to the eyebox. In this manner, the light from at least some of the plurality of projector assemblies may be combined within the display element to form a multi-channel image (e.g., full color) that is output toward the eyebox.

A projector emits light in a particular channel (e.g., red). The projector includes a plurality of optical components that are in optical series and one or more actuators. The one or more actuators (e.g., piezoelectric motor, voice-coil, etc.) are configured to adjust a position of at least one optical component of the plurality of optical components in accordance with instructions from the display controller 150. The adjustment may be to, e.g., compensate for misalignment of a portion of the image formed from one color channel relative to a portion of the image formed from light emitted from one or more of the other projectors, compensate for misalignment of one or more of the plurality of optical components, or both.

The display controller 150 dynamically may control positions of some or all of the plurality of optical components in the actuator-aligned multi-channel projector assemblies of the display elements 120. The display controller 150 may, e.g., monitor temperatures of the projectors (and/or their optical components) using one or more temperature sensors (e.g., thermocouples). The display controller 150 may determine (e.g., using a model, image feedback, etc.) target positions for one or more optical components based in part on the monitored temperatures. The display controller 150 may instruct actuators to adjust positions for the one or more optical components to their respective target positions. In this manner the display assembly is able to compensate for misalignment of optical elements within projectors and/or misalignment of the different projectors relative to each other (e.g., to ensure chromatic aberration in full color image is below a threshold value). The display assembly is discussed in detail below with regard to, e.g., FIGS. 2-6.

In some embodiments, light from the actuator-aligned multi-channel projector assembly is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). In some embodiments, some or all of the illuminators are projectors in the actuator aligned multi-channel projector assemblies. The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller processes information from the sensor array that describes sounds detected by the sensor array. The audio controller may comprise a processor and a computer-readable storage medium. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
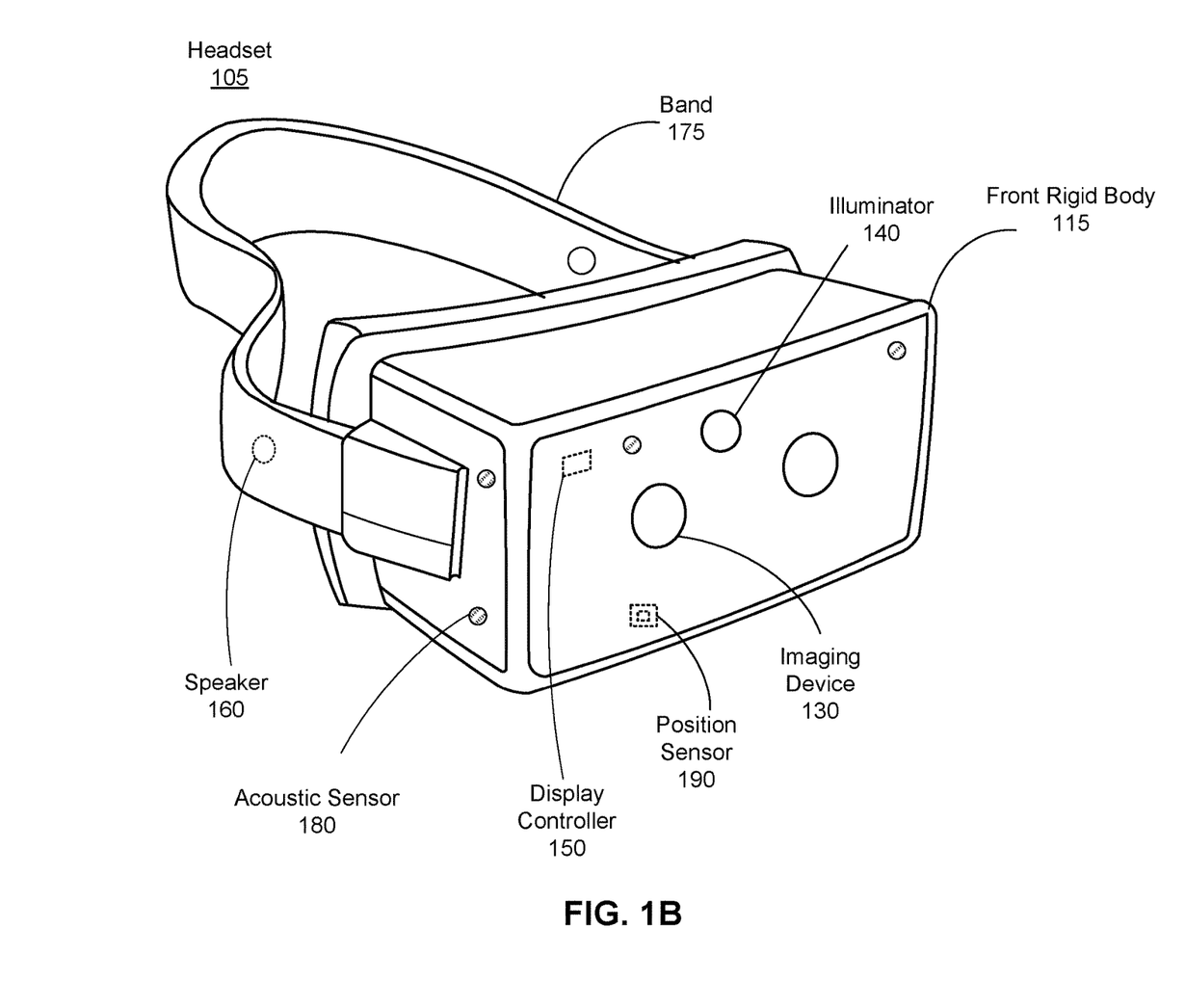
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly including one or more actuator aligned multi-channel projector assemblies and one or more combination elements, a DCA, an audio system, and a position sensor 190. FIG. 1B shows the illuminator 140, a plurality of the speakers 160, a plurality of the imaging devices 130, a plurality of acoustic sensors 180, the display controller 150, and the position sensor 190. The speakers 160 may be located in various locations, such as coupled to the band 175 (as shown), coupled to front rigid body 115, or may be configured to be inserted within the ear canal of a user.

Figure 2:
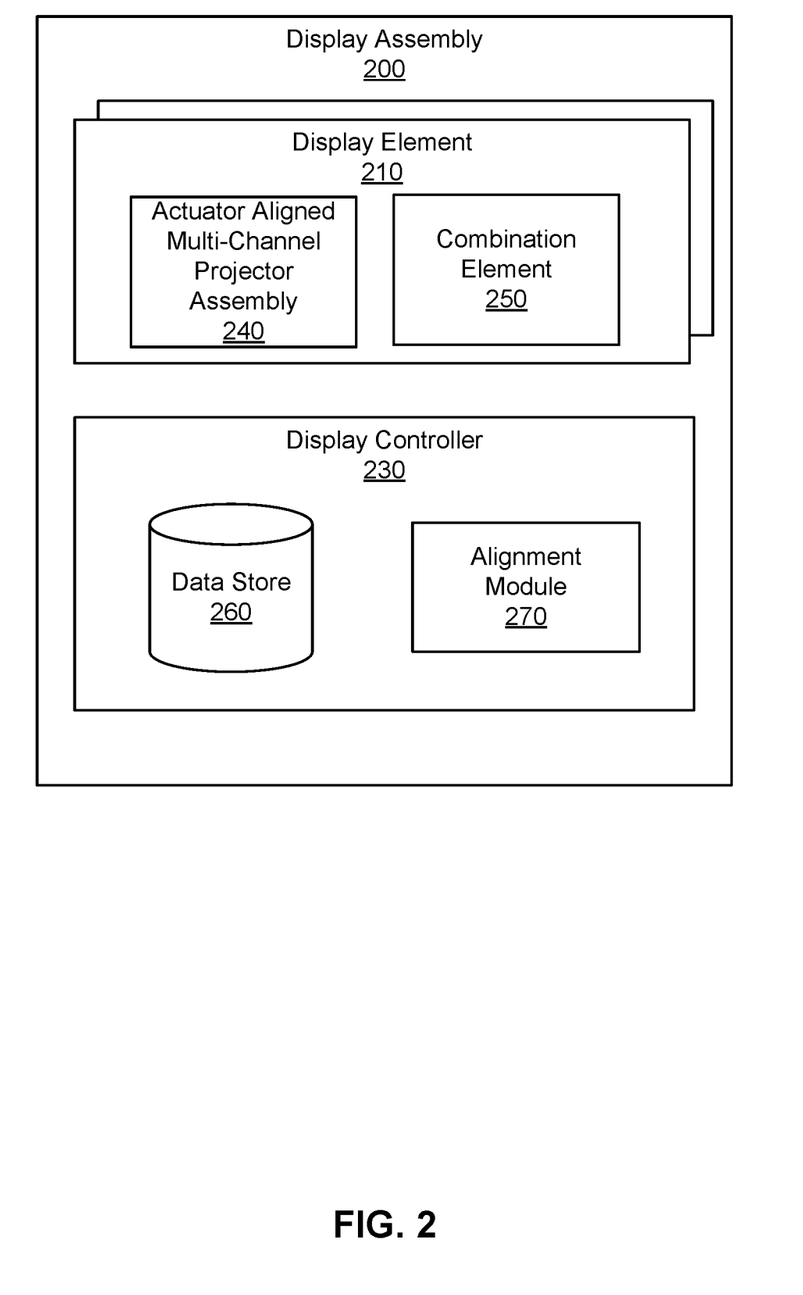
FIG. 2 is a block diagram of a display assembly, in accordance with one or more embodiments.

FIG. 2 is a block diagram of a display assembly 200, in accordance with one or more embodiments. The display assembly in FIG. 1A or FIG. 1B may be an embodiment of the display assembly 200. The display assembly 200 displays content. In the embodiment of FIG. 2, the display assembly 200 includes one or more display elements 210, and a display controller 230. Some embodiments of the display assembly 200 have different components than those described here. Similarly, in some cases, functions can be distributed among the components in a different manner than is described here.

The one or more display elements 210 present content. In some embodiments, there may be one or more display elements 120 for each eye of a user. For example, there may be a display element 210 for a one eye of the user, and another display element for the other eye of the user. In some embodiments, a display element 120 generates image light that is provided to an eyebox (e.g., of a headset). A display element 210 includes an actuator aligned multi-channel projector assembly 240 and a combination element 250.

The actuator aligned multi-channel projector assembly 240 projects multiple channels of light toward an eye box. The channels may be monochrome. And in some embodiments, the channels may include different colors (e.g., red, green, blue, etc.). In some embodiments, the channels may also include a non-visible band (e.g., near-infrared). The actuator aligned multi-channel projector assembly 240 includes a plurality of projectors that each emit light in a respective channel. The plurality of projectors include at least one projector that emits light in a different channel than another projector of the plurality of projectors. In some embodiments, the plurality of projectors includes projectors of different channels (e.g., a projector that emits red light, a projector that emits green light, and a projector that emits blue light) sufficient to generate a full color image.

A projector emits light in a particular channel (e.g., red). The projector includes a plurality of optical components that are in optical series and one or more actuators. Additional details relating to the projector are described below with regard to FIGS. 3, 4A, and 4B. Optical components are components used to generate and/or act upon (e.g., adjust optical power, control light path, etc.) the light within a projector. Optical components include a light source and a plurality of optical elements. The light source may include a plurality of components that generate light (e.g., light emitting diodes (LEDs), micro-LEDS, laser diodes, etc.) and are arranged in 1D or 2D arrays. Optical components may also include, e.g., optical elements (e.g., lenses, apertures, gratings, etc.), some other component that can act upon the light, or some combination thereof. For example, if a projector has a channel in a non-visible band, the projector may include a grating to generate a structured light pattern that may be used by an eye tracker. In some embodiments, the plurality of optical elements may also include a varifocal lens. A varifocal lens is a lens whose optical power may be dynamically adjusted over a range of values (e.g., −30 to +30 Diopters). The varifocal lens may be spheric, aspheric, or both (e.g., aspheric on a first surface and spheric on a second surface). In some embodiments, the range of values is discrete (e.g., 0.1 Diopter intervals). In some embodiments, the range of values is continuous. The varifocal lens may have different transduction mechanisms (e.g., electrowetting, piezoelectric, electrostatic) that are used to adjust the optical power. In some embodiments, the varifocal lens may have the largest amount of optical power of any single lens of the plurality of lenses. In some embodiments, the varifocal lens is placed farthest from the light source of the plurality of optical components.

Some or all of the projectors of an actuator aligned multi-channel projector assembly 240 may include one or more temperature sensors. A temperature sensor may be a thermocouple. In some embodiments, the temperatures sensors, for a given projector, may be configured to monitor temperature of the projector and/or some or all of the optical components within the projector. In some embodiments, a temperature sensor may be used to monitor temperature for different projectors.

The one or more actuators are configured to adjust positions of one or more optical component within a projector in accordance with instructions from the display controller 230. An actuator may be, e.g., piezoelectric motor, voice-coil, a shape memory alloy (SMA), electrostatic comb-drive, some other mechanism for adjusting position of an optical component, or some combination thereof. An actuator may be configured to move an optical component such that it has one or more degrees of freedom. For example, an actuator may translate an optical component along an optical axis (e.g., z axis) of the projector, translate the optical component perpendicular (e.g., x-axis and/or y-axis) to the optical axis, rotate the optical component about the optical axis, rotate the optical component about an axis perpendicular to the optical axis, or some combination thereof. In some embodiments, the one or more actuators are configured to simultaneously move a plurality of optical components of a projector. Additional details relating to actuation of optical components of a projector are described below with regard to FIG. 3.

The combination element 250 combines light of different channels into a multi-channel image. The combination element 250 may provide the multi-channel image to an eyebox and/or some other component that provides the multi-channel image to the eyebox. The combination element 250 may be, e.g., one or more mirrors, one or more lenses, one or more waveguides, some other component that combines light of different channels, or some combination thereof. For example, the combination element 250 may be a stack of waveguides (e.g., one for each channel). Each waveguide may include a respective incoupling element and a respective outcoupling element. An incoupling element (e.g., a grating) in-couples light of a particular bands into the waveguide, and an outcoupling element (e.g., a grating) outcouples light from the waveguide. The stack of waveguides maybe positioned such that the outcoupling elements output their respective light to form a multi-channel image. In other embodiments, there may be a single waveguide in which the light from each of the channels is incoupled, and light from each of the channels is outcoupled from a single outcoupling element on the waveguide to form a multi-channel image. In some embodiments, the combination element 250 may be coupled to one or more actuators that move the combination element 250 relative to one or more projectors of the actuator aligned multi-channel projector assembly 240. For example, light in a first channel (e.g., red monochrome light) may be incoupled into the combination element 250 (e.g., waveguide). A position of the projector relative to the combination element 250 may be adjusted to, e.g., align a portion of the multi-channel image formed from light of the first channel with a portion of the multi-channel image formed from light of a second channel (e.g., light from a different projector), focus the portion of the multi-channel image formed from light of the first channel, reduce optical error/aberration in the portion of the multi-channel image formed from light of the first channel, or some combination thereof.

The display controller 230 controls operation of the display assembly 200. In the embodiment of FIG. 2, the display controller 230 includes a data store 260, and an alignment module 270. The display controller 150 may be an embodiment of the display controller 230. The display controller 230 may be located inside a headset, in some embodiments. Some embodiments of the display controller 230 have different components than those described here. Similarly, functions can be distributed among the components in different manners than described here. For example, some functions of the display controller 230 may be performed external to the display assembly 200.

The data store 260 stores data for use by the display assembly 200. Data in the data axis store 260 may include content to be rendered by the one or more display elements 210, an alignment model, and other data relevant for use by the display assembly 200, or any combination thereof. The alignment model may be used to determine aligned positions of various components of the display assembly. In some embodiments, the alignment model is a look up table. In other embodiments, the alignment model is a machine learned model. The alignment model may determine target positions for the various components as functions of temperature, an amount of error in the multi-channel image, etc. A target position is a position at which a component (e.g., an optical component, a projector, a combination element 250, etc.) is considered to be aligned.

The alignment module 270 is configured to detect misalignment of the components of the one or more actuator aligned multi-channel projector assemblies 240. A component (e.g., optical component) may move out of alignment due to a variety of reasons. For example, thermal effects may cause a curvature of a lens to change thereby adjusting a location of its focal plane. Likewise, if the display assembly 200 is subject to a sudden impulse (e.g., dropped), the impulse may shift positions of various optical components in the actuator aligned multi-channel projector assembly 240 and/or the combination element 250.

The alignment module 270 may monitor temperatures of the projectors (and/or their optical components) using signals from the one or more temperature sensors. The alignment module 270 may input one or more of the monitored temperatures into an alignment model. The alignment model may, e.g., describe target positions as a function of temperature for one or more components (e.g., optical components, holder, lens barrel) of some or all of the projectors, target positions for some or all of the projectors, target positions for some or all of the combination elements 250, or some combination thereof. In this manner, the alignment model identifies one or more actuators to make adjustments, and amounts of adjustments to be made, to place one or more optical components, one or more projectors, one or more combination elements 250, or some combination thereof, to their respective target positions based on the monitored temperatures.

In some embodiments, the alignment module 270 may determine target positions (e.g., for optical components, for lens barrel, for holder, for projectors, for combination elements) using image feedback. In these instances a portion of the multi-channel image is monitored using a camera. The camera produces images of the visual content (i.e., the multi-channel image) being presented. The alignment module 270 may input the images into the alignment model to determine target positions to offset the errors. The alignment model processes the images to determine amounts of error (e.g., focus, chromatic aberration, etc.) in the multi-channel image, and identifies one or more actuators to make adjustments, and amounts of adjustments to be made, in target positions for one or more optical components, one or more projectors, one or more combination elements 250, or some combination thereof, that mitigate the determined errors.

In some embodiments, the alignment module 270 may determine target positions (e.g., for optical components, for lens barrel, for holder, for projectors, for combination elements) using closed feedback. In these instances information from one or more sensors may be used to determine the target position. The one or more sensors may include, e.g., a position sensor (e.g., the position sensor 190), accelerometer, gyroscope, magnetometer, ultrasonic transducers, some other motion sensor, or some combination thereof.

The alignment module 270 generates actuation instructions for the identified one or more actuators that when implemented would cause the identified one or more actuators to move their corresponding one or more optical components, lens barrel, holder, one or more projectors, one or more combination elements 250, or some combination thereof, to their respective target positions. The alignment module 270 may provide the actuation instructions to the identified one or more actuators and/or their respective multi-channel projector assembly 240. In this manner the alignment module 270 is able to compensate for misalignment of optical elements within projectors, misalignment of the different projectors relative to each other (e.g., to ensure chromatic aberration in full color image is below a threshold value), misalignment of projectors to the combination element 250, or some combination thereof.

Figure 3:
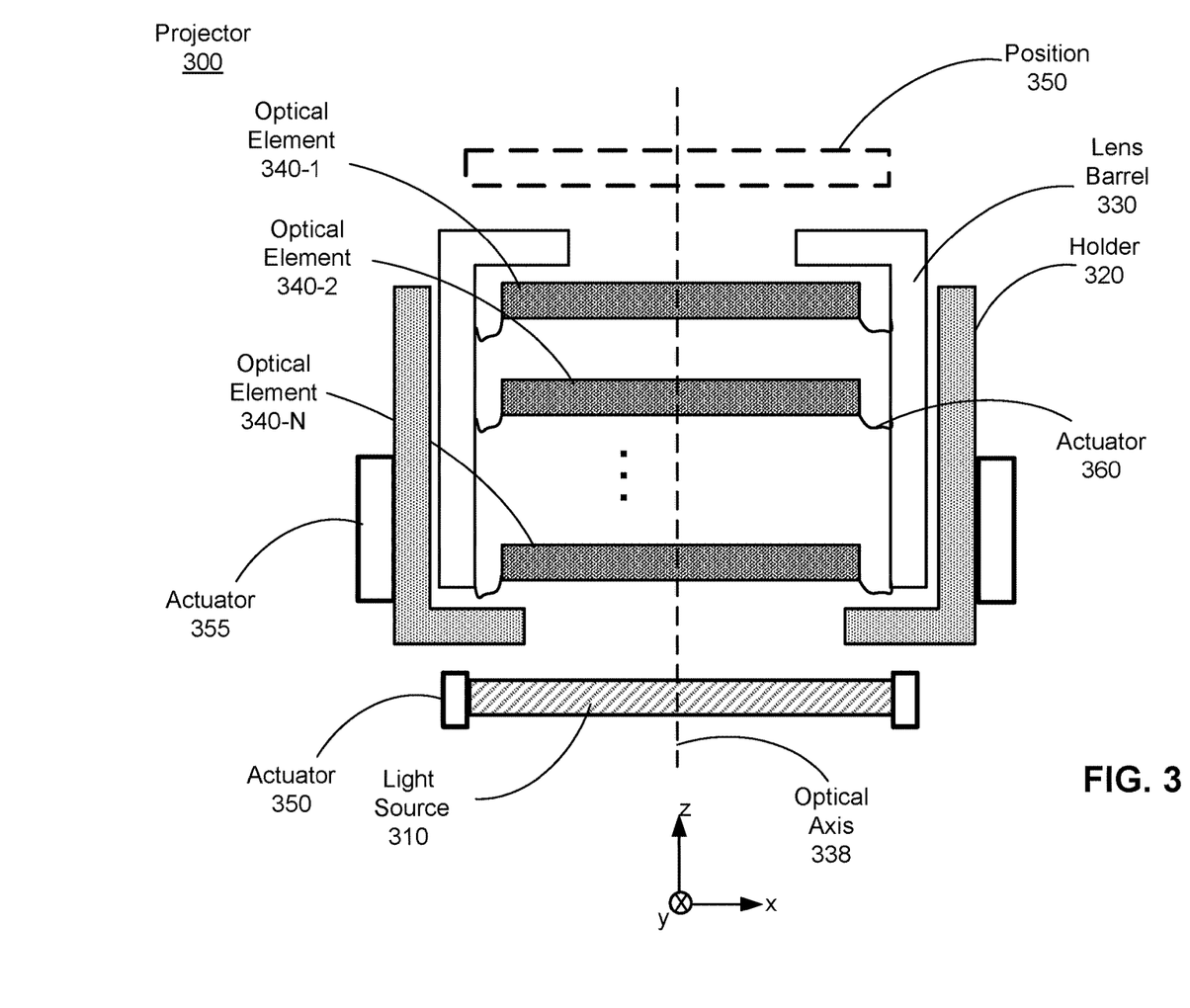
FIG. 3 is an cross section of a projector, in accordance with one or more embodiments.

FIG. 3 is an cross section of a projector 300, in accordance with one or more embodiments. The projector 300 is a single channel projector, and may be a projector of the actuator aligned multi-channel projector assembly 240. The projector 300 includes a holder 320, a lens barrel 330, a plurality of optical components, and a plurality of actuators. The optical components are in optical series and include, e.g., a light source 310 and a plurality of optical elements (e.g., lenses).

The light source 310 is configured to generate light. The light is of a particular channel. For example, the light source 310 may generate red light, green light, blue light, yellow light, infrared light, etc. The light source 310 may be, e.g., a 2-D light source (e.g., microLEDs, LEDs, etc.).

The holder 320 holds the lens barrel 330. In some embodiments, the holder 320 may be configured to allow some range of movement of the lens barrel 330 within the holder 320. The range of movement may be, e.g., parallel to an optical axis 338 of the projector 300, orthogonal to the optical axis 338, a rotation about the optical axis 338, a rotation about an axis orthogonal to the optical axis 338, or some combination thereof. For example, the holder may allow movement along and/or parrel to the optical axis 338 to adjust focus of the projector 300. The holder 320 may be made out of plastic, metal, or some other rigid material.

The lens barrel 330 holds one or more optical elements. An optical element is an optical component that conditions light. In some embodiments, the lens barrel 330 may be configured to allow some range of movement of optical components within the lens barrel 330. The range of movement may be, e.g., parallel to the optical axis 338, orthogonal to the optical axis 338, a rotation about the optical axis 338, a rotation about an axis orthogonal to the optical axis 338, or some combination thereof.

The plurality of optical elements condition light from the light source 310 such that it may be used by, e.g., a combination element, to generate image light. An optical element may include, e.g., an aperture, a lens (e.g., Fresnel lens, convex lens, concave lens, varifocal lens, etc.), a filter (e.g., color filter), a spatial light modulator, a grating, a reflecting surface, or any other suitable optical element that affects image light. The plurality of optical elements may be coupled to the lens barrel 330 such that one or more of their respective positions may be adjusted (via one or mor actuators). In some embodiments, the plurality of optical components may also include at least one lens whose position is fixed in place within the lens barrel. As illustrated in FIG. 3 there are N (an integer) optical elements that are in optical series, of which optical element 340-1, optical element 340-2, and optical 340-N, are shown. In some embodiments, all of the optical elements are lenses. In some embodiments, at least one of the optical elements is a grating. For example, in embodiments where the light source 310 emits NIR, the grating may be used to generate a structured light pattern (e.g., used to illuminate the eye for eye tracking).

In some embodiments, at least one of the plurality of optical elements is a varifocal lens. In some embodiments, the varifocal lens may have the largest amount of optical power of any single lens of the plurality of optical elements. In some embodiments, the varifocal lens is placed farthest from the light source 310 of the plurality of optical components. For example, the optical element 340-1 may be the varifocal lens. In another example, the varifocal lens may be placed outside of the lens barrel 330. For example, the varifocal lens may be located at a position 350 that outside of the lens barrel 330, such that light projected from the lens barrel 330 is refracted by the varifocal lens prior to exiting the projector 300.

The plurality of actuators are configured to adjust positions of one or more optical component within the projector 300 (e.g., in accordance with instructions from the display controller 230). The plurality of actuators are embodiments of the actuators described above with regard to FIG. 2. As illustrated in FIG. 3, the plurality of actuators include, e.g., actuators 350, 355, and 360. Actuators 350 are configured to adjust the position of the light source 310. The actuators 350 are configured to adjust a position of the light source 310. The actuators 355 may be configured to adjust a position of the holder 320 (including the lens barrel 330 and the plurality of optical elements) relative to the light source 310. The actuators 360 are coupled to some or all of the plurality of optical elements, and are configured to adjust positions of some or all of the plurality of optical components. Actuators (e.g., 350, 355, 360) may be configured to move an optical component such that it has one or more degrees of freedom. For example, an actuator may translate an optical component along and/or parallel to the optical axis 338, translate the optical component perpendicular to the optical axis (e.g., along an axis parallel to x-axis and/or y-axis), rotate the optical component about the optical axis, rotate the optical component about an axis perpendicular to the optical axis, or some combination thereof. Note that as illustrate each of the optical elements, the holder 320, and the light source 310 may be actuated. In other embodiments, some or all of these may not be actuated and/or other components of the projector (e.g., lens barrel 330) may be actuated.

Figure 4A:
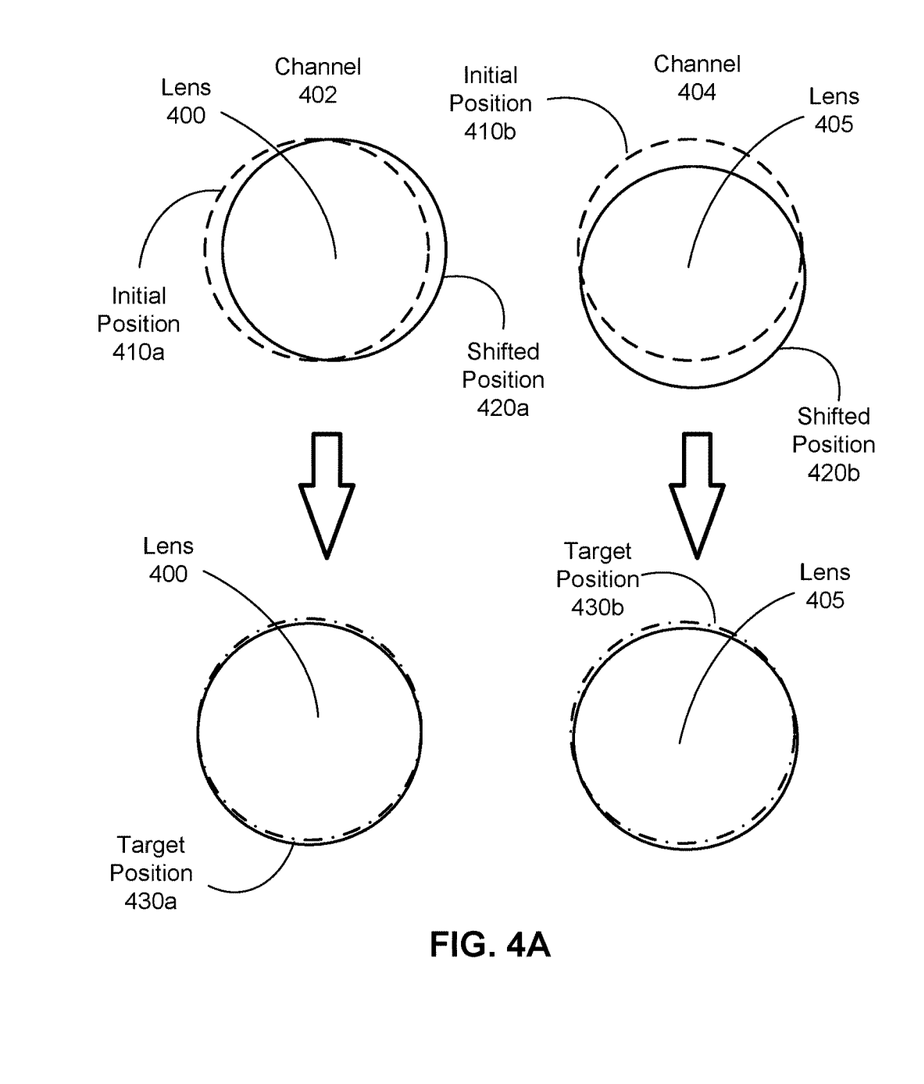
FIG. 4A illustrates aligning boresights of an actuator aligned multi-channel projector assembly, according to one or more embodiments.

FIG. 4A illustrates aligning boresights of an actuator aligned multi-channel projector assembly, according to one or more embodiments. The actuator aligned multi-channel projector assembly may be an embodiment of the actuator aligned multi-channel projector assembly 240. In FIG. 4A, two boresights are shown of the actuator aligned multi-channel projector assembly, one for a channel 402, and another for a channel 404. Channels 402, 404, may be, e.g., different colors (e.g., red and green). A lens 400 of the channel 402 has an initial position 410a, and a lens 405 of the channel 404 has an initial position 410b. In some embodiments, the initial positions 410a, 410b, may be, e.g., a position to which the lenses 400, 405 were placed during alignment. However, for some reason (e.g., curing of bonding material, thermal effects, dropping device, etc.) the positions of the lens 400 and the lens 405 have shifted to a shifted position 420 and a shifted position 420b, respectively. As illustrated, the shifted positions 420a, 420b, are such that the lenses 400, 405 are out of alignment. Accordingly, a display controller (e.g., the display controller 230) may detect the misalignment of the lenses 400, 405 and instruct one or more actuators (not shown) to re-position the lens 400 and the lens 405 to a target position 430a (or more generally within a threshold offset from the target position 430a) and a target position 430b (or more generally within a threshold offset from the target position 430b), respectively. The target position is a position in which a lens is properly aligned to compensate for misalignment of a portion of an image formed from light of the channel 402 light relative to a portion of the image formed from the light of the channel 404. The target positions 430a, 430b, may also ensure that the light from each channel 402, 404 is properly focused and/or.

Figure 4B:
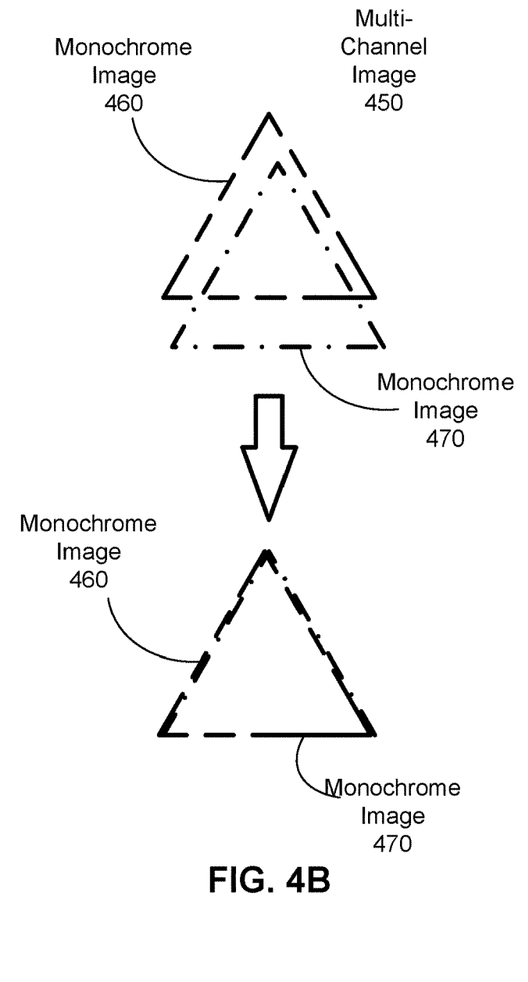
FIG. 4B illustrates channel alignment of an image formed using the actuator aligned multi-channel projector assembly of FIG. 4A.

FIG. 4B illustrates channel alignment of a multi-channel image 450 formed using the an actuator aligned multi-channel projector assembly of FIG. 4A. As illustrated, the image 450 includes a monochrome image 460 that is formed from the light of the channel 402, and a monochrome image 470 that is formed from the light of the channel 404. Due to the lenses 400, 405 being located at the shifted positions 420a, 420b, the monochrome images 460, 470 are out of alignment thereby introducing chromatic aberration into the image 450. As illustrated, the display controller mitigates the misalignment of the monochrome images 460, 470 by adjusting the lenses 400, 405 to their target positions 430a, 430b (or more generally within some threshold distance of their target positions), thereby reducing chromatic aberration in the multi-channel image 450. Note, while FIG. 4B is in the context of monochrome light, in other embodiments, the images 460 and 470 may not be monochromatic and may just be different color channels.

Figure 5:
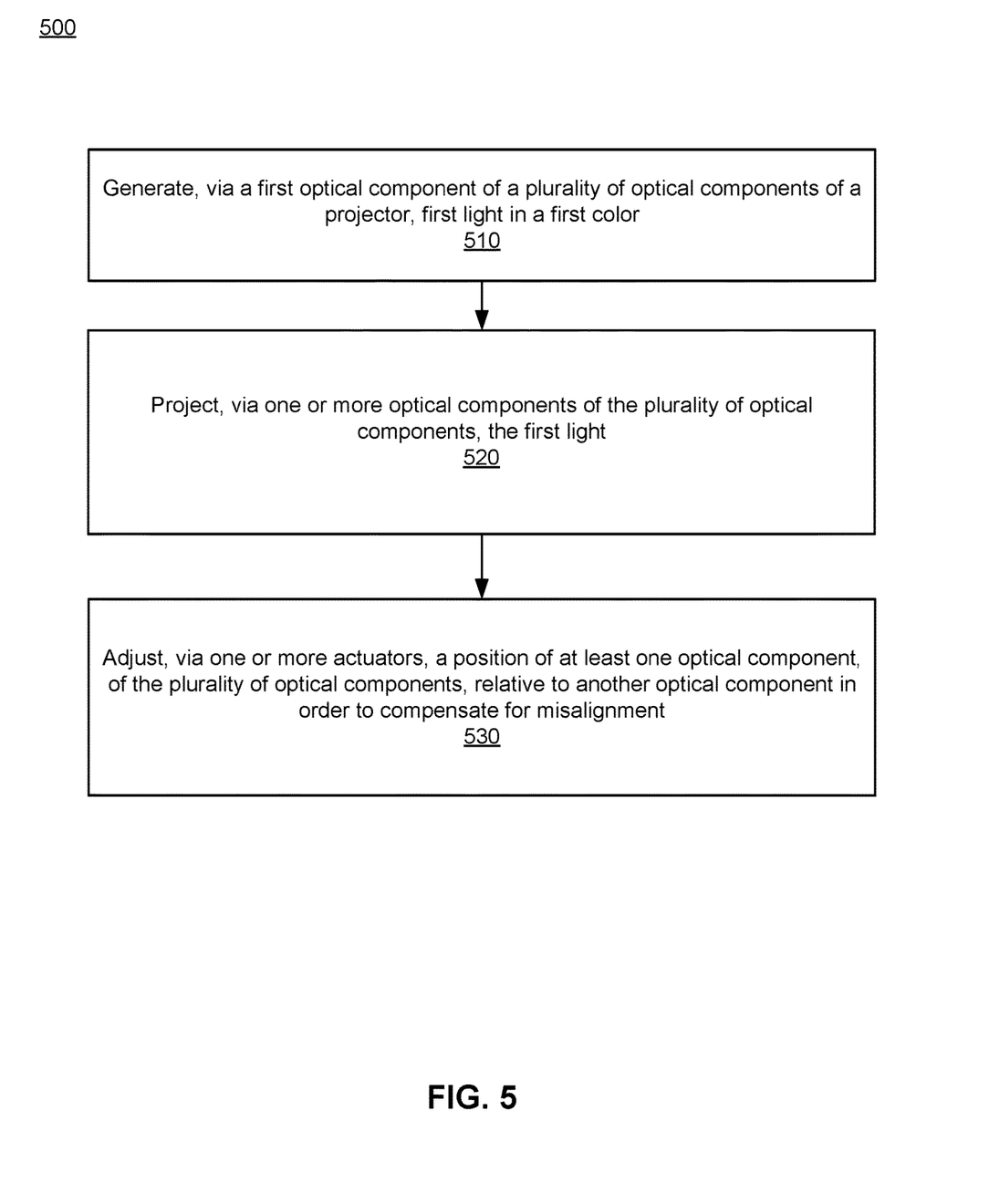
FIG. 5 is a flowchart illustrating a process for aligning a projector, in accordance with one or more embodiments.

FIG. 5 is a flowchart of a process 500 for aligning a projector, in accordance with one or more embodiments. The process shown in FIG. 5 may be performed by components of projector. Other entities may perform some or all of the steps in FIG. 5 in other embodiments. Embodiments may include different and/or additional steps, or perform the steps in different orders.

The projector generates 510 first light in a first color. The first light is generated via a first optical component (e.g., a light source) of a plurality of optical components of the projector. The first light may be monochrome.

The projector projects 520 the first light. The projector includes a at least one optical element (e.g., lens) configured to project the first light. The first light may be output from the projector and combined with a second light in a different color to form an image. The second light may be monochrome. The image may be presented via a display element of a headset to a user.

The projector adjusts 530 a position of at least one optical component of the plurality of optical components relative to another optical component of the plurality of optical components to compensate for misalignment. The adjustment may be made via one or more actuators. The misalignment being compensated for may be, e.g., misalignment of a portion of the image formed from the first light relative to a portion of the image formed from the second light, misalignment causing the image formed from the first light to be out of focus, some other misalignment (e.g., resulting in aberration), or some combination thereof.

Figure 6:
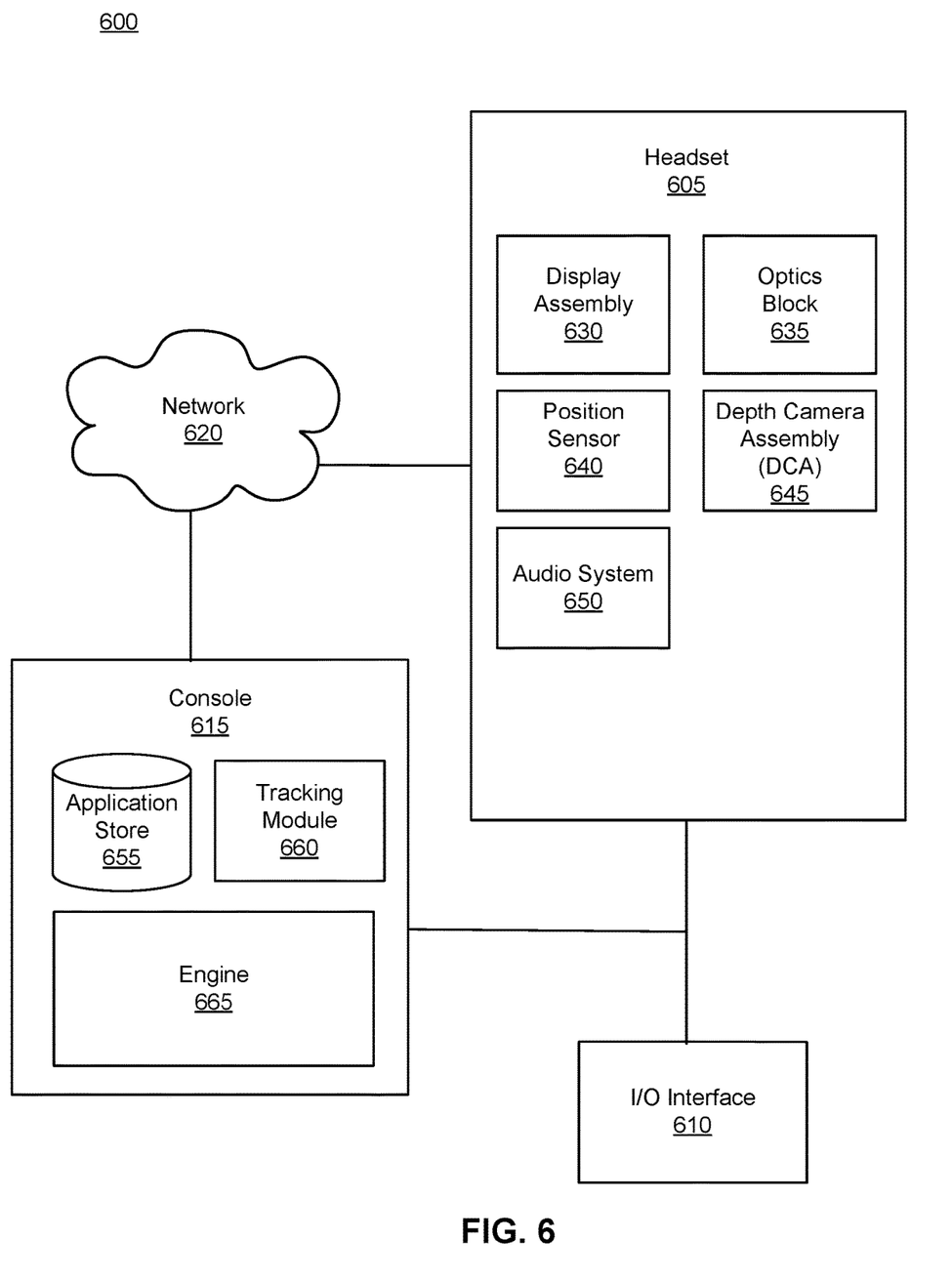
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 is an embodiment of the display assembly 200. The display assembly 630 displays the content using one or more display elements (e.g., the display elements 210) that include respective actuator aligned multi-channel projectors and combination elements. Note in some embodiments, the display element 210 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 provides audio content to a user of the headset 605. The audio system 650 is substantially the same as the audio system 200 describe above. The audio system 650 may comprise one or acoustic sensors, one or more transducers, and an audio controller. The audio system 650 may provide spatialized audio content to the user. In some embodiments, the audio system 650 may request acoustic parameters from a server over a network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the server, and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 may couples the headset 605 and/or the console 615 to each other and/or one or more servers. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A projector, comprising:
   a plurality of optical components in optical series, the plurality of optical components including:
     a light source configured to generate first light in a first color,
     at least one lens that is configured to project the first light, wherein the first light is output from the projector and combined with a second light in a different color to form an image presented via a display element of a headset to a user, wherein the plurality of optical components includes a plurality of lenses that includes the at least one lens, the plurality of lenses includes a varifocal lens, and the varifocal lens is located farther from the light source than any remaining lens of the plurality of lenses; and
   one or more actuators configured to adjust a position of at least one optical component of the plurality of optical components relative to another optical component of the plurality of optical components in order to compensate for misalignment of a portion of the image formed from the first light relative to a portion of the image formed from the second light.

2. The projector of claim 1, wherein the one or more actuators are configured to move one or more of the optical components along an optical axis of the projector.

3. The projector of claim 1, wherein the one or more actuators are configured to move one or more of the optical components perpendicular to an optical axis of the projector.

4. The projector of claim 1, wherein the plurality of optical components includes a plurality of lenses that includes the at least one lens, and the one or more actuators are configured to simultaneously move the plurality of lenses.

5. The projector of claim 1, wherein the first light is incoupled into a waveguide, and a position of the projector relative to the waveguide is adjusted to align the portion of the image formed from the first light with the portion of the image formed from the second light.

6. The projector of claim 1, wherein the varifocal lens has a larger optical power than other lens of the plurality of lenses.

7. The projector of claim 1, wherein a controller is configured to:
   determine a target position for the at least one optical component based in part on a temperature of a portion of the projector; and
   instruct the one or more actuators to adjust the position of the at least one optical component to the target position.

8. The projector of claim 7, further comprising a temperature sensor that is configured to determine the temperature.

9. A method comprising:
   generating, via a first optical component of a plurality of optical components of a projector, a first light in a first color from a first light source, wherein the plurality of optical components are in optical series;
   projecting, via one or more optical components of the plurality of optical components, the first light, wherein the first light is output from the projector and combined with a second light in a different color from a second light source to form an image presented via a display element of a headset to a user, wherein the plurality of optical components includes a plurality of lenses that includes a varifocal lens, and the varifocal lens is located farther from the light sources than any remaining lens of the plurality of lenses; and
   adjusting, via one or more actuators, a position of at least one optical component, of the plurality of optical components, relative to another optical component of the plurality of optical components in order to compensate for misalignment of a portion of the image formed from the first light relative to a portion of the image formed from the second light.

10. The method of claim 9, wherein adjusting, via the one or more actuators, the position of the at least one optical component comprises:
    moving, via the one or more actuators, one or more of the optical components along an optical axis of the projector.

11. The method of claim 9, wherein adjusting, via the one or more actuators, the position of the at least one optical component comprises:
    moving, via the one or more actuators, one or more of the optical components perpendicular to an optical axis of the projector.

12. The method of claim 9, wherein adjusting, via the one or more actuators, the position of the at least one optical component comprises:
    moving simultaneously, via the one or more actuators, the plurality of lenses.

13. The method of claim 9, wherein the first light is incoupled into a waveguide, and a position of the projector relative to the waveguide is adjusted to align the portion of the image formed from the first light with the portion of the image formed from the second light.

14. The method of claim 9, further comprising:
    adjusting an optical power of the varifocal lens.

15. The method of claim 14, wherein the varifocal lens has a larger optical power than other lens of the plurality of lenses.

16. The method of claim 9, wherein adjusting, via the one or more actuators, the position of at least one optical component, further comprises:
    determining a target position for the at least one optical component based in part on a temperature of a portion of the projector; and
    instructing the one or more actuators to adjust the position of the at least one optical component to the target position.

17. A non-transitory computer readable medium configured to store program code instructions, when executed by a processor, cause the processor to perform steps comprising:
    generating, via a first optical component of a plurality of optical components of a projector, a first light in a first color from a first light source, wherein the plurality of optical components are in optical series;
    projecting, via one or more optical components of the plurality of optical components, the first light, wherein the first light is output from the projector and combined with a second light in a different color from a second light source to form an image presented via a display element of a headset to a user, wherein the plurality of optical components includes a plurality of lenses that includes a varifocal lens, and the varifocal lens is located farther from the light sources than any remaining lens of the plurality of lenses; and
    adjusting, via one or more actuators, a position of at least one optical component, of the plurality of optical components, relative to another optical component of the plurality of optical components in order to compensate for misalignment of a portion of the image formed from the first light relative to a portion of the image formed from the second light.

18. The computer readable medium of claim 17, the steps further comprising:
    adjusting an optical power of the varifocal lens.

19. The computer readable medium of claim 17, wherein adjusting, via the one or more actuators, the position of at least one optical component, further comprises:
    determining a target position for the at least one optical component based in part on a temperature of a portion of the projector; and
    instructing the one or more actuators to adjust the position of the at least one optical component to the target position.

* * * * *